US010656923B1

(12) United States Patent
Farivar et al.

(10) Patent No.: US 10,656,923 B1
(45) Date of Patent: May 19, 2020

(54) SYSTEMS FOR DETERMINING REGULATORY COMPLIANCE OF SMART CONTRACTS

(71) Applicant: Capital One Services, LLC, McLean, VA (US)

(72) Inventors: Reza Farivar, Champaign, IL (US); Austin Walters, Savoy, IL (US); Anh Truong, Champaign, IL (US); Vincent Pham, Champaign, IL (US); Fardin Abdi Taghi Abad, Seattle, WA (US); Mark Watson, Urbana, IL (US); Jeremy Edward Goodsitt, Champaign, IL (US); Kenneth Taylor, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/527,068

(22) Filed: Jul. 31, 2019

(51) Int. Cl.
| | |
|---|---|
| *G06F 9/45* | (2006.01) |
| *G06F 8/41* | (2018.01) |
| *G06F 8/33* | (2018.01) |
| *G06N 3/04* | (2006.01) |

(52) U.S. Cl.
CPC ............... *G06F 8/42* (2013.01); *G06F 8/33* (2013.01); *G06N 3/049* (2013.01)

(58) Field of Classification Search
CPC ................................ G06F 8/425; G06F 8/433
USPC ............................... 717/140–145; 706/43–47
See application file for complete search history.

(56) References Cited

U.S. PATENT DOCUMENTS

| | | | | |
|---|---|---|---|---|
| 5,701,400 | A * | 12/1997 | Amado | G06N 5/02 706/45 |
| 6,789,069 | B1 * | 9/2004 | Barnhill | G06K 9/623 706/12 |
| 7,296,005 | B2 * | 11/2007 | Minamino | G10L 15/144 704/E15.029 |

(Continued)

FOREIGN PATENT DOCUMENTS

WO  2018231255 A1  12/2018

OTHER PUBLICATIONS

Narayanan et al, "Research for Practice: Cryptocurrencies, Blockchains, and Smart Contracts; Hardware for Deep Learning", ACM, pp. 48-51 (Year: 2017).*

(Continued)

*Primary Examiner* — Anil Khatri
(74) *Attorney, Agent, or Firm* — Troutman Sanders LLP; Christopher J. Forstner; John A. Morrissett

(57) ABSTRACT

A system for determining regulatory compliance of smart contracts is disclosed. The system may receive positive smart contracts that comply with regulations, convert positive section(s) of the positive smart contracts into a first set of intermediate representation of code, and train a neural network to classify smart contract sections. The system may then receive a first smart contract including first sections, convert the first sections into a second set of intermediate representation of code, classify the second set of intermediate representation of code as a first classification corresponding to the first set of intermediate representation of code or as a second classification not corresponding to the first set of intermediate representation of code, and generate for display a negative or positive indication based on the classification.

20 Claims, 6 Drawing Sheets

(56) References Cited

U.S. PATENT DOCUMENTS

| | | | | |
|---|---|---|---|---|
| 7,430,546 | B1* | 9/2008 | Suri | G06N 3/08 706/16 |
| 7,502,763 | B2* | 3/2009 | Ayala | G06N 3/105 706/6 |
| 7,665,073 | B2* | 2/2010 | Meijer | G06F 8/425 717/108 |
| 7,672,920 | B2* | 3/2010 | Ito | G06K 9/00335 706/30 |
| 7,734,556 | B2* | 6/2010 | Tan | G06F 17/277 706/45 |
| 7,937,349 | B2* | 5/2011 | Pucher | G06N 20/00 706/45 |
| 8,326,785 | B2* | 12/2012 | Niu | G06F 16/334 706/45 |
| 8,739,137 | B2* | 5/2014 | Siskind | G06F 8/447 717/136 |
| 9,224,096 | B2* | 12/2015 | Oppenheimer | G06F 11/3419 |
| 9,864,933 | B1* | 1/2018 | Cosic | G06K 9/66 |
| 9,965,741 | B2* | 5/2018 | Dhandapani | G06F 17/5009 |
| 10,095,888 | B1* | 10/2018 | Lee | G06F 21/64 |
| 10,402,731 | B1* | 9/2019 | Cosic | A63F 13/55 |
| 10,440,180 | B1* | 10/2019 | Jayapalan | G06N 20/00 |
| 10,474,934 | B1* | 11/2019 | Cosic | G06K 9/6202 |

OTHER PUBLICATIONS

Hu et al, "Hierarchical interactions between Ethereum smart contracts across Testnets", ACM, pp. 7-12 (Year: 2018).*

Norta, "Self-Aware Smart Contracts with Legal Relevance", IEEE, pp. 1-8 (Year: 2018).*

Ganin et al, "Domain-Adversarial Training of Neural Networks", Journal of Machine Learning Research, pp. 1-35 (Year: 2016).*

White et al, "Deep Learning Code Fragments for Code Clone Detection", ACM, pp. 87-98 (Year: 2016).*

Lewis et al, "Scaling of Neural Network Inferencing by Efficient Storage and Retrieval of Outputs", ACM, pp. 10-14 (Year: 1997).*

He et al, "Learning to Fuzz from Symbolic Execution with Application to Smart Contracts", ACM, pp. 531-548 (Year: 2019).*

Krol et al, "ChainSoft: Collaborative Software Development using Smart Contracts", ACM, pp. 1-6 (Year: 2018).*

Khoa et al, "Stock Price Forecasting using Back Propagation Neural Networks with Time and Profit Based Adjusted Weight Factors", ACM, pp. 5484-5488 (Year: 2006).*

"'Smart Contracts' & Legal Enforceability," Cardozo Blockchain Project Research Report #2, Oct. 16, 2018 (28 pages).

Wikipedia, "Intermediate representation," https://en.wikipedia.org/wiki/Intermediate_representation, page last updated Dec. 23, 2018 (3 pages).

Wikipedia, "LLVM," https://en.wikipedia.org/wiki/LLVM, page last updated Jun. 9, 2019 (10 pages).

Finkel, H. et al., "Code transformation and analysis using Clang and LLVM; Static and Dynamic Analysis," Computer Science Summer School 2017, pp. 34-36 (134 pages).

AST representation in GCC (http://icps.u-strasbg.fr/~pop/gcc-ast.html); last visited Jun. 26, 2019; (8 pages).

* cited by examiner

SYSTEMS FOR DETERMINING REGULATORY COMPLIANCE OF SMART CONTRACTS

FIELD OF INVENTION

The present disclosure relates to systems for determining regulatory compliance of smart contracts, more particularly systems for training and using neural network(s) to classify new smart contracts based on smart contracts known to be in and out of compliance with regulations.

BACKGROUND

A smart contract is a computer protocol that can digitally enforce the performance of a contract. Smart contracts allow for trackable and irreversible transactions to be performed without third parties. However, smart contracts need to comply with regulations (e.g., case law, rules, statutes, etc.) to avoid later disputes surrounding the validity of the smart contracts. Currently, it is difficult to quickly and efficiently determine whether existing smart contracts comply or likely comply with regulations due to formatting and jargon disparities between smart contracts (in the form of computer software code) and regulations (in the form of legal opinions or "case law" in various formats based on a particular court" and rules and statutes from various regulatory bodies each having their own format). Laborious manual review of whether a smart contract is in compliance with applicable regulation(s) can become impractical and cost-prohibitive when the smart contract is too long, or the number and length of applicable regulations is too great. Further, as smart contracts often have multiple sections each focused on a different subject matter and potentially subject to different regulations, requiring a separate professional to manually review various sections of a single smart contract sends the costs even higher. Thus, there is a need to automatically and efficiently determine whether certain sections of a smart contract likely comply with regulations (or have errors) so that the errors can be corrected and that the smart contract can be brought into compliance with the regulations.

Accordingly, there is a need for systems to determine whether one or more sections of a smart contract has errors in an automatic and efficient way. Embodiments of the present disclosure are directed to this and other considerations.

SUMMARY

Disclosed embodiments provide systems and methods for determining compliance of smart contracts.

Consistent with the disclosed embodiments, various methods and systems are disclosed. In an embodiment, a system performing a method for determining compliance of a smart contract is disclosed. The method may include receiving training data including one or more positive smart contracts (e.g., having one or more positive sections) that comply with one or more regulations. The method may include converting the one or more positive sections into a first set of intermediate representation of code and training a neural network (NN) to classify smart contract sections based on the first set of intermediate representation of code. The method may include receiving a first smart contract including one or more first sections, converting the one or more first sections into a second set of intermediate representation of code, and classifying (e.g., using the NN) the second set of intermediate representation of code as a first classification corresponding to the first set of intermediate representation of code or as a second classification not corresponding to the first set of intermediate representation of code. When the second set of intermediate representation of code is classified as the first classification, the method includes generating for display a positive indication that the one or more first sections comply with the one or more regulations. When the second set of intermediate representation of code is classified as the second classification, the method includes generating for display a negative indication that the one or more first sections do not comply with the one or more regulations.

In another embodiment, a system performing a method for determining compliance of a smart contract is disclosed. The method may include receiving first training data including one or more positive smart contracts (e.g., having one or more positive sections) that comply with one or more regulations, and converting the one or more positive sections into a first set of intermediate representation of code. The method may also include receiving second training data including one or more negative smart contracts (e.g., having one or more negative sections) that do not comply with one or more regulations, and converting the one or more negative sections into a second set of intermediate representation of code. The method may further include training a neural network (NN) to classify smart contract sections based on the first and second sets of intermediate representation of code. After training the NN, the method may include receiving a first smart contract including one or more first sections, converting the one or more first sections into a third set of intermediate representation of code, and classifying (e.g., using the NN) the third set of intermediate representation of code as a first classification corresponding to the first set of intermediate representation of code or as a second classification corresponding to the second set of intermediate representation of code. When the second set of intermediate representation of code is classified as the first classification, the method includes generating for display a positive indication that the one or more first sections comply with the one or more regulations. When the second set of intermediate representation of code is classified as the second classification, the method includes generating for display a negative indication that the one or more first sections do not comply with the one or more regulations.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
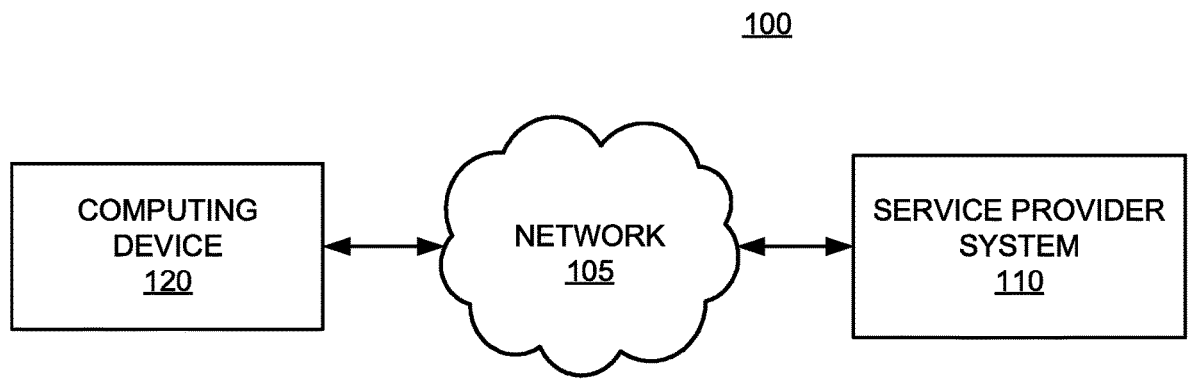
FIG. 1 is a diagram of an example system environment that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, "intermediate representation of code" should be construed to mean a special tuple- or stack-based code used internally by a compiler or virtual machine to represent source code. Most modern compilers use intermediate representation of code or simply intermediate representation where the linear human-readable text representing a program is transformed into a graph structure that allows flow analysis and re-arrangement before creating a sequence of actual CPU instructions. An apt example language commonly used in modern compilers is the LLVM intermediate representation.

As a compiler goes through source code, it goes through various phases, for example preprocessing, lexical analysis, parsing, syntax analysis and semantic analysis. The result of these phases is the construction of an Abstract Semantic Tree (AST). For example, LLVM compilers use Clang to represent the AST of a compiled program. At the next stage, compilers go through the AST graph, and construct code blocks in the intermediate representation (IR) language (e.g., Clang CodeGen). These code blocks are standardized and act as basic building blocks, which the compiler picks and puts together to achieve the syntantic and semantic meaning associated with a parse tree. These basic building blocks are used in the disclosed systems. Specifically, when the term "intermediate representation of code" is used throughout this application, it refers to standardized building blocks written in IR language.

This disclosure discusses a first neural network (NN) and a second NN. It is envisioned that the first or the second NN could be a recurrent neural network (RNN), a convolutional neural network (CNN), a recurrent convolutional neural network (RCNN), or a deep learning neural network.

In an aspect, a system performing a method for determining compliance of a smart contract is disclosed. The method may include receiving training data including one or more positive smart contracts (e.g., having one or more positive sections) that comply with one or more regulations. The method may include converting the one or more positive sections into a first set of intermediate representation of code and training a neural network (NN) to classify smart contract sections based on the first set of intermediate representation of code. The method may include receiving a first smart contract including one or more first sections, converting the one or more first sections into a second set of intermediate representation of code, and classifying (e.g., using the NN) the second set of intermediate representation of code as a first classification corresponding to the first set of intermediate representation of code or as a second classification not corresponding to the first set of intermediate representation of code. When the second set of intermediate representation of code is classified as the first classification, the method includes generating for display a positive indication that the one or more first sections comply with the one or more regulations. When the second set of intermediate representation of code is classified as the second classification, the method includes generating for display a negative indication that the one or more first sections do not comply with the one or more regulations.

In certain example implementations, the training data further includes one or more negative smart contracts that do not comply with the one or more regulations, each of the one or more negative smart contracts having one or more negative sections.

In some example implementations, the method includes converting the one or more negative sections into a third set of intermediate representation of code and training the NN to classify smart contract sections based on the third set of intermediate representation of code. The classifying step may include classifying the second set of intermediate representation of code as the first classification, second classification, or as a third classification corresponding to the third set of intermediate representation of code.

In other example implementations, the method also includes assigning a first probability factor to the first classification and generating a first probability factor indication for display based on the assigned first probability factor.

In certain example implementations, the method also includes assigning a second probability factor to the third classification and generating a second probability factor indication for display based on the assigned second probability factor.

In some example implementations, the method also includes identifying one or more first errors in the second set of intermediate representation of code.

In other example, implementations, the method also includes generating, for display, an indication of the one or more first errors.

In some example implementations, the method also includes receiving a revised first smart contract including one or more revised first sections that corresponds with and corrects the one or more first errors in the one or more first sections of the first smart contract. The method also includes converting the one or more revised first sections into a fourth set of intermediate representation of code and training a second NN based on the fourth set of intermediate representation of code to suggest a change to a second smart contract that would correct one or more second errors.

In other example implementations, the method includes receiving the second smart contract including the one or more second sections, converting the one or more second sections into a fifth set of intermediate representation of code, classifying (e.g., using the first NN) the fifth set of intermediate representation of code as a third classification corresponding to the third representation of code, identifying one or more second errors in the fifth set of intermediate representation of code, and generate a suggested change to the one or more second sections that would correct the one or more second errors.

In certain example implementations, the method includes transmitting either the positive indication or the negative indication for each of the one or more first sections to a user device (e.g., computing device 120) for display. Additionally, in certain example implementations, the first smart contract was received from the user device.

In some example implementations, the first NN is a convolutional neural network (CNN), a recurrent neural network (RNN), or a convolutional recurrent neural network (CRNN).

In another aspect, a system performing a method for determining compliance of a smart contract is disclosed. The method may include receiving a smart contract including one or more sections, converting the one or more sections into a first set of intermediate representation of code, classifying (e.g., using a NN) the first set of intermediate representation of code as a first classification of being in a same category as a second set of intermediate representation of code associated with one or more positive smart contracts that comply with one or more regulations or as a second classification as not being in the same category as the second set of intermediate representation of code, generate for display a positive indication that the one or more sections comply with the one or more regulations in response to classifying the first set of intermediate representation of code as the first classification, and generate for display a negative indication that the one or more sections do not comply with the one or more regulations in response to classifying the first set of intermediate representation of code as the second classification.

In certain example implementations, the method includes classifying (e.g., using the NN) the first set of intermediate representation of code as a first classification, as a second classification, or as a third classification as being in a same category as the third set of intermediate representation of code associated with one or more negative smart contracts that do not comply with the one or more regulations.

In some example implementations, the method includes identifying one or more first errors in first set of intermediate representation of code, one or more second errors in the first set of intermediate representation of code or a combination thereof. In response to identifying the one or more first errors, the method may include generating for display an indication of the one or more first errors.

In other example implementations, the method includes generating a first confidence score that the first classification is correct and generating a first confidence score indication for display based on the generated first confidence score.

In certain example implementations, the method includes generating a second confidence score that the third classification is correct and generating a second confidence score indication for display based on the generated second confidence score.

In some example implementations, the method includes generating for display a suggested change to the one or more sections that would correct the one or more second errors in response to identifying one or more second errors.

In certain example implementations, the NN is a convolutional neural network (CNN), a recurrent neural network (RNN), or a convolutional recurrent neural network (CRNN).

In yet another aspect, a system performing a method for training a system for determining compliance of a smart contract is disclosed. The method may include receiving first training data including one or more positive smart contracts (e.g., having one or more positive sections) that comply with one or more regulations. The method may include converting the one or more positive sections into a first set of intermediate representation of code. The method may include receiving second training data including one or more negative smart contracts (e.g., having one or more negative sections) that do not comply with one or more regulations. The method may include converting the one or more negative sections into a second set of intermediate representation of code. The method may also include training a neural network (NN) to classify smart contract sections based on the first set of intermediate representation of code and the second set of intermediate representation of code. The method may include receiving a first smart contract including one or more first sections, converting the one or more first sections into a third set of intermediate representation of code, and classifying (e.g., using the NN) the third set of intermediate representation of code as a first classification corresponding to the first set of intermediate representation of code or as a second classification corresponding to the second set of intermediate representation of code. When the second set of intermediate representation of code is classified as the first classification, the method includes generating for display a positive indication that the one or more first sections comply with the one or more regulations. When the second set of intermediate representation of code is classified as the second classification, the method includes generating for display a negative indication that the one or more first sections do not comply with the one or more regulations.

In some example implementations, the NN is a convolutional neural network (CNN), a recurrent neural network (RNN), or a convolutional recurrent neural network (CRNN). In certain example implementations, one or more compilers are used to convert the one or more positive sections of the one or more positive smart contracts into a first set of intermediate representation of code and the one or more compilers are used to convert the one or more negative sections of the one or more negative smart contracts into a second set of intermediate representation of code.

Reference will now be made in detail to example embodiments of the disclosed technology, examples of which are illustrated in the accompanying drawings and disclosed herein. Wherever convenient, the same references numbers will be used throughout the drawings to refer to the same or like parts.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, system 100 may include a service provider system 110 in communication with a computing device 120 via network 105. In some embodiments, service provider system 110 may also be in communication with various databases. Computing device 120 may be a mobile computing device (e.g., a smart phone, tablet computer, smart wearable device, portable laptop computer, voice command device, wearable augmented reality device, or other mobile computing device) or a stationary device (e.g., desktop computer).

Network 105 may be of any suitable type, including individual connections via the internet such as cellular or WiFi networks. In some embodiments, network 105 may connect terminals using direct connections such as radio-frequency identification (RFID), near-field communication (NFC), Bluetooth™, low-energy Bluetooth™ (BLE), WiFi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
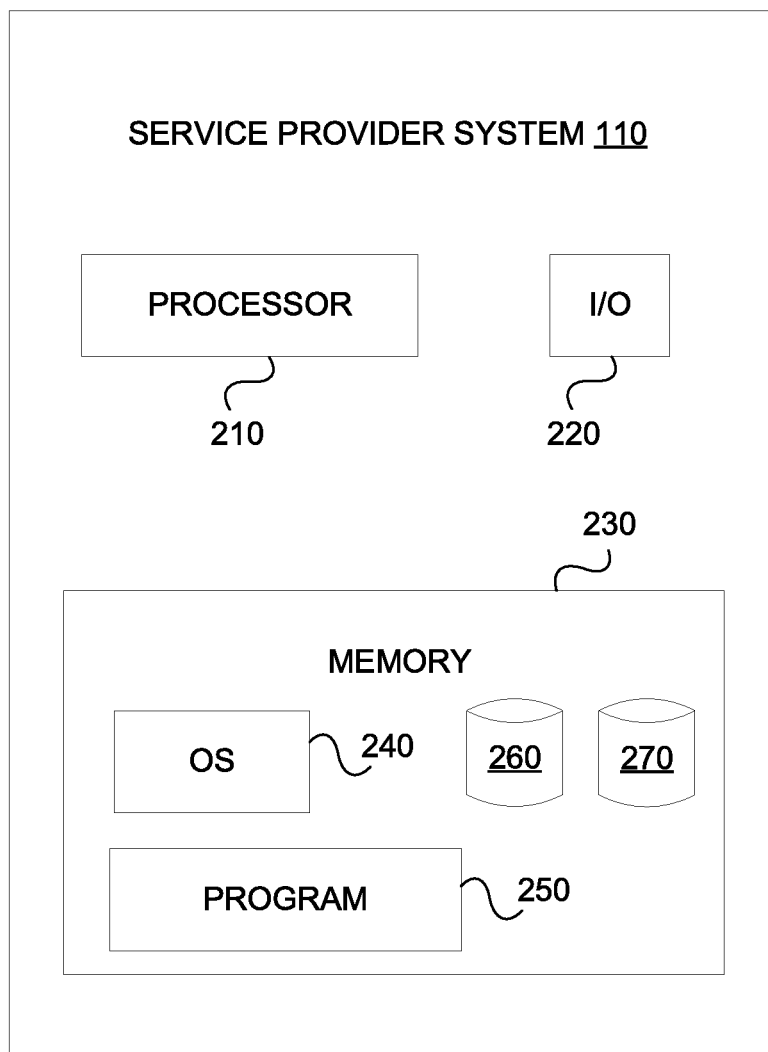
FIG. 2 is a component diagram of a service provider system according to an example embodiment.

An example embodiment of service provider system 110 is shown in more detail in FIG. 2. Computing device 120 may have a similar structure and components that are similar to those described with respect to service provider system 110. As shown, service provider system 110 may include a processor 210, an input/output ("I/O") device 220, a memory 230 containing an operating system ("OS") 240 and a program 250. For example, service provider system 110 may be a single server or may be configured as a distributed computer system including multiple servers or computers that interoperate to perform one or more of the processes and functionalities associated with the disclosed embodiments. In some embodiments, service provider system 110 may further include a peripheral interface, a transceiver, a mobile network interface in communication with processor 210, a bus configured to facilitate communication between the various components of the service provider system 110, and a power source configured to power one or more components of service provider system 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™ ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, service provider system 110 may be configured to remotely communicate with one or more other devices, such as computer device 120. According to some embodiments, service provider system 110 may utilize a NN, word embeddings, a Markov chain, or a probabilistic parser to translate one or more legal clauses from legalese to plain English.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider system 110 may include one or more storage devices configured to store information used by processor 210 (or other components) to perform certain functions related to the disclosed embodiments. In one example, service provider system 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider system 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider system 110 may include memory 230 that may include one or more programs 250 to perform one or more functions of the disclosed embodiments. Moreover, processor 210 may execute one or more programs 250 located remotely from service provider system 110. For example, service provider system 110 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include an image processing database 260 and a neural-network pipeline database 270 for storing related data to enable service provider system 110 to perform one or more of the processes and functionalities associated with the disclosed embodiments.

Service provider system 110 may also be communicatively connected to one or more memory devices (e.g., databases (not shown)) locally or through a network. The remote memory devices may be configured to store information and may be accessed and/or managed by service provider system 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Service provider system 110 may also include one or more I/O devices 220 that may include one or more interfaces for receiving signals or input from devices and providing signals or output to one or more devices that allow data to be received and/or transmitted by service provider system 110. For example, service provider system 110 may include interface components, which may provide interfaces to one or more input devices, such as one or more keyboards, mouse devices, touch screens, track pads, trackballs, scroll wheels, digital cameras, microphones, sensors, and the like, that enable service provider system 110 to receive data from one or more users (such as via computing device 120).

In example embodiments of the disclosed technology, service provider system 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider system 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 110 may include a greater or lesser number of components than those illustrated.

Figure 3:
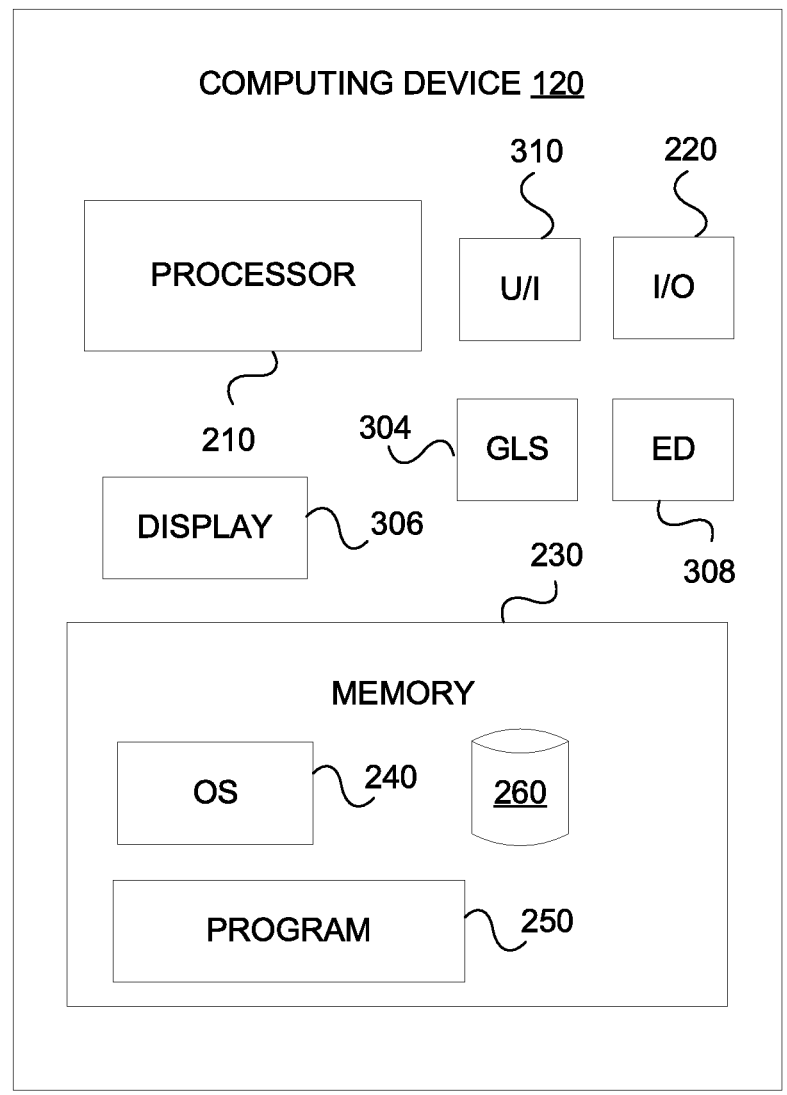
FIG. 3 is a component diagram of a computing device according to an example embodiment.

FIG. 3 shows an example embodiment of computing device 120. As shown, computing device 120 may include input/output ("I/O") device 220 for receiving data from another device (e.g., service provider system 110), memory 230 containing operating system ("OS") 240, program 250, and any other associated component as described above with respect to service provider system 110. Computing device 120 may also have one or more processors 210, a geographic location sensor ("GLS") 304 for determining the geographic location of computing device 120, a display 306 for displaying content such as text (e.g., patent claims or legal clauses), text messages, images, and selectable buttons/icons/links, an environmental data ("ED") sensor 308 for obtaining environmental data including audio and/or visual information, and a user interface ("U/I") device 310 for receiving user input data, such as data representative of a click, a scroll, a tap, a press, or typing on an input device that can detect tactile inputs. User input data may also be non-tactile inputs that may be otherwise detected by ED sensor 308. For example, user input data may include auditory commands. According to some embodiments, U/I device 310 may include some or all of the components described with respect to input/output device 220 above. In some embodiments, environmental data sensor 308 may include a microphone and/or an image capture device, such as a digital camera.

Figure 4:
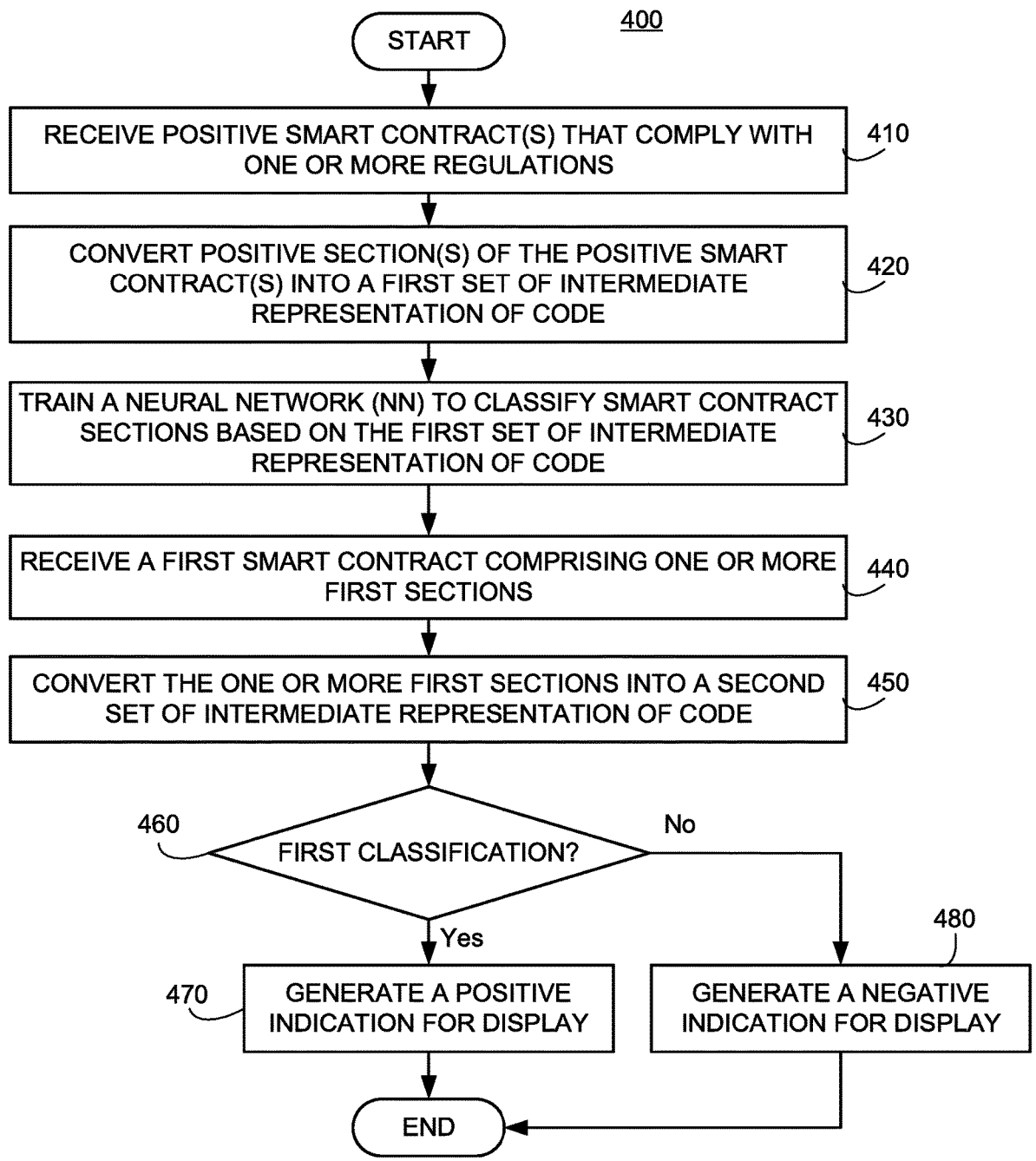
FIG. 4 is a flowchart of a method for training a neural network and determining compliance of a smart contract according to an example embodiment.

FIG. 4 shows a flowchart of a method 400 for determining whether a smart contract likely complies with regulations. Although method 400 may be performed by the service provider system 110, the computing device 120, or a combination thereof, the method is described as being performed by the service provider system 110 for ease of reference.

In block 410 of method 400, the service provider system 110 may receive training data including one or more positive smart contracts that comply with one or more regulations. Each of the one or more positive smart contracts may have one or more sections, but all of those sections must be positive sections. In some embodiments, the training data also includes one or more negative smart contracts that do not comply with the one or more regulations, each of the one or more negative smart contracts having one or more negative sections that do not comply with the one or more regulations. A user of computing device 120 may prepare existing smart contracts as training data by comparing numerous smart contracts and categorizing each one as a positive smart contract or a negative smart contact based on whether the smart contract complies with regulations of a particular jurisdiction (e.g., state, country, or province). For example, a user may analyze a smart contract and the regulations of Virginia to determine whether a smart contract is unconscionable or whether the smart contract includes a material mistake that would render the smart contract unenforceable. In some embodiments, the training data may be regulation and/or jurisdiction specific (e.g., Virginia-specific training data where a first smart contract is a positive smart contract based on one or more applicable regulations of Virginia, and Maryland-specific training data where the first smart contract is a negative smart contract based on one or more applicable regulations of Maryland).

In block 420, the service provider system 110 may convert the one or more positive sections of the one or more positive smart contracts into a first set of intermediate representation of code. In some embodiments, the service provider system 110 may convert the one or more positive sections of one or more positive jurisdiction specific (e.g., Virginia-based) smart contracts. In some embodiments, the service provider system 110 may convert the one or more negative sections of the one or more negative smart contracts into a third set of intermediate representation of code. In some embodiments, the service provider system 110 may convert the one or more negative sections of one or more negative jurisdiction specific (e.g., Virginia-based) smart contracts. In some embodiments, the service provider system 110 may also convert one or more positive sections of the one or more negative smart contracts into the first set of intermediate representation of code. In some embodiments, the service provider system 110 may also convert one or more positive sections of the one or more negative jurisdiction specific (Virginia-based) smart contracts into the first set of intermediate representation of code. In some embodiments, the service provider system 110 may use a complier to generate the first set of intermediate representation of code and the third set of intermediate representation of code. In some embodiments, the positive sections may be converted into the first set of intermediate representation of code by performing word embedding (e.g., transforming words into its representative numerical value in a feature space) on the one or more positive sections of the one or more positive smart contracts. In other embodiments, the positive smart contracts may be converted into the first set of intermediate representation of code by creating a "bag-of-words" model (e.g., a bag of legal words) and counting the words that fall into the "bag-of-words" model to create "bag-of-words" features.

In block 430, the service provider system 110 may train a neural network (NN) to classify smart contract sections based on one or more of the first set of intermediate representation of code and the third set of intermediate representation of code. Training the NN may involve the NN accepting either the word embeddings or the bag of words features and a set of labels as predictors whether it's a positive or not positive (or negative) section. This requires a large set of samples in order to train the NN sufficiently.

In block 440, the service provider system 110 may receive a first smart contract including one or more first sections. For example, a user of computing device 120 may send, via the network 105 and to the service provider system 110, the first smart contact. The computer device 120 may email, upload via an online portal, or otherwise provide the first smart contract in any practical means to the service provider system 110.

In block 450, the service provider system 110 may convert the one or more first sections into a second set of intermediate representation of code. For example, the service provider system 110 may utilize a compiler to convert the one or more first sections into the second set of intermediate representation of code.

In block 460, the service provider system 110 may classify, by the NN, the second set of intermediate representation of code as either a first classification corresponding to the first set of intermediate representation of code or as a second classification not corresponding to the first set of intermediate representation of code. In some embodiments, classifying includes assigning a value between 0 and 1 to the second set of intermediate representation of code based on classifying either as a first classification or a second classification depending on how closely the second set of intermediate representation of code matches or corresponds with the first set of intermediate representation of code. A threshold value of 0.7 or above that the second set of intermediate representation of code correspond with the first classification (e.g., a good match with one or more positive sections). A value of less than 0.7 means that the second set of intermediate representation of code corresponds with the second classification (e.g., a poor match with the one or more positive sections).

In block 470, the service provider system 110, responsive to classifying the second set of intermediate representation of code as a first classification, generate for display a positive indication that the one or more first sections comply with the one or more regulations. For example, the positive indication may be a check mark (e.g., a green checkmark) or a green circle, located at the beginning of each of the one or more first sections.

In block 480, the service provider system 110, responsive to classifying the second set of intermediate representation of code as the second classification, generate for display a negative indication that the one or more sections do not comply with the one or more regulations. For example, the negative indication may be an "X", a red circle, a red octagon, or any other indication located at the beginning of each of the one or more first sections. In some embodiments the service provider system 110 may transmit either the positive indication or the negative indication of the one or more first sections to a user device (e.g., computing device 120) for display.

In some embodiments, the service provider system 110 may assign a first probability factor to the first classification. The service provider system 110 may assign a probability factor of 0-100 (with 100 being an exact match or exact classification) based on how close the second set of intermediate representations of code matches, corresponds with, or classifies with the first set of intermediate representation of code. For example, the service provider system 110 may assign a probability factor of 89 to the second set of intermediate representation of code indicating that there is a 89% confidence level that the one or more first sections of the first smart contact complies with the regulation(s). The service provider system 110 may generate a first probability factor indication that may be displayed for the user of the user device (e.g., computing device 120). The first probability factor indication may be based on the assigned first probability factor. In some embodiments, the service provider system 110 may assign a second probability factor to the third classification and generate a second probability factor indication for display based on the second probability factor. In some embodiments, the service provider system 110 generates for display an expiration date associated with a particular regulation (e.g., a particular regulation remains in effect until June 2020). Thus, the service provider system 110 may place the generated expiration date next to the generated first probability factor.

In some embodiments, the service provider system 110 may identify one or more first errors in the second set of intermediate representation of code or in the one or more first sections. For example, the service provider system 110 may identify that a first section is in a Virginia-based contract and includes a loan provision of more than 12% per year, which is not permitted in Virginia. As another example, the service provider system 110 may identify corresponding phrases and sentences that are vague or unclear pronouns and suggest replacement.

In some embodiments, the service provider system 110 may generate for display an indication of the one or more first errors. For example, the service provider system 110 may generate an indication that says "error" next to the section that contains the first error. As an alternative example, the service provider system 110 may highlight the error or place a comment on the identified first error labeling the comment as "error."

In some embodiments, the service provider system 110 may receive a revised first smart contract including one or more revised first sections that corresponds with and corrects the one or more first errors in the one or more first sections of the first smart contract. The service provider system 110 may convert the one or more revised first sections into a fourth set of intermediate representation of code. The service provider system 110 may train a second NN (separate from the first NN) based on the fourth set of intermediate representation of code to suggest a change to a second smart contract that would correct one or more second errors. In some embodiments, the service provider system 110 may train the second NN to automatically correct a second smart contract containing one or more second errors.

In some embodiments, the service provider system 110 may receive the second smart contract including the one or more second sections. The service provider system 110 may convert the one or more second seconds into a fifth set of intermediate representation of code. The service provider system 110 may classify, by the first NN, the fifth set of intermediate as the third classification corresponding to the third set of intermediate representation of code. The service provider system 110, via the second NN, may generate a suggested change to the one or more second sections that would correct the one or more second errors. For example, the service provider system 110 may generate a suggested change by guessing the purpose of the one or more second sections (e.g., classifying the one or more sections based on its purpose), searching for similar one or more sections in its database that are used for the same purpose, and proposing language from the one or more sections in the its database to suggest a change to correct the one or more second errors. Alternatively, the service provider system 110 may simply display the one or more sections from its database that are correct and have the same purpose as the one or more second sections. As an alternative example, the service provider system 110 may generate a suggested change by identifying phrases and sentences that are vague or unclear pronouns and suggest replacement based on grammatical rules. In other embodiments, the service provider system 110 may, via the second NN, change the one or more the one or more second sections to automatically correct the one or more second errors. Similar to suggesting a change, the service provider system 110 may guess the purpose of the one or more second sections (e.g., classifying the one or more sections based on its purpose), searching for similar one or more sections in its database that are used for the same purpose, and use language from the one or more sections in the its database to correct the one or more second errors. As an alternative example, the service provider system 110 may identify phrases and sentences that are vague or unclear pronouns and replace them based on grammatical rules. In some embodiments, if the service provider system 110 classifies the fifth set of intermediate representation of code as the first classification corresponding to the first set intermediate representation of code, then the service provider system 110 may generate, for display, a positive indication that the one or more second sections of the second smart contract comply with one or more regulations.

Figure 5:
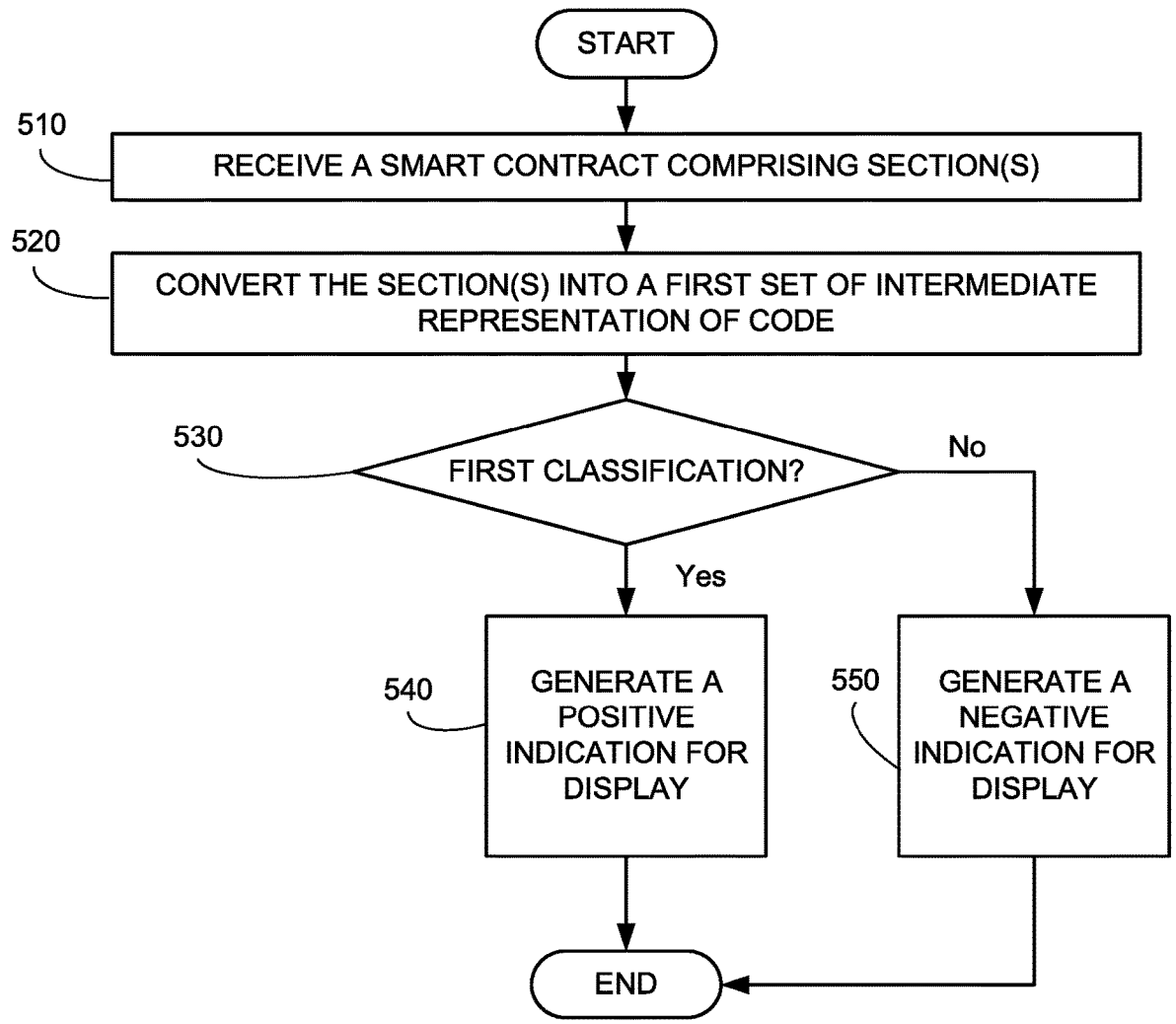
FIG. 5 is a flowchart of a method for determining compliance of a smart contract according to an example embodiment.

FIG. 5 shows a flowchart of a method 500 for determining whether a smart contract likely complies with regulations. Method 500 is similar to method 400 except that method 500 omits blocks corresponding to blocks 410, 420, and 430. Thus, blocks 440, 450, 460, 470, and 480 are similar to blocks 510, 520, 530, 540, and 550, respectively, and their description is not repeated for brevity. This embodiment illustrates that the training aspect of the NN may be conducted by a separate system from the operational system for receiving, converting, classifying, and generating indications for display. One reason for separating the training steps form the operational steps is that this will allow the neural network (NN) to be trained on a different resource (e.g., running on a graphics processing unit (GPU)) that will be more performant and not necessary for the operations steps or run on a machine that has more random-access memory (RAM) and/or central processing unit (CPU).

Figure 6:
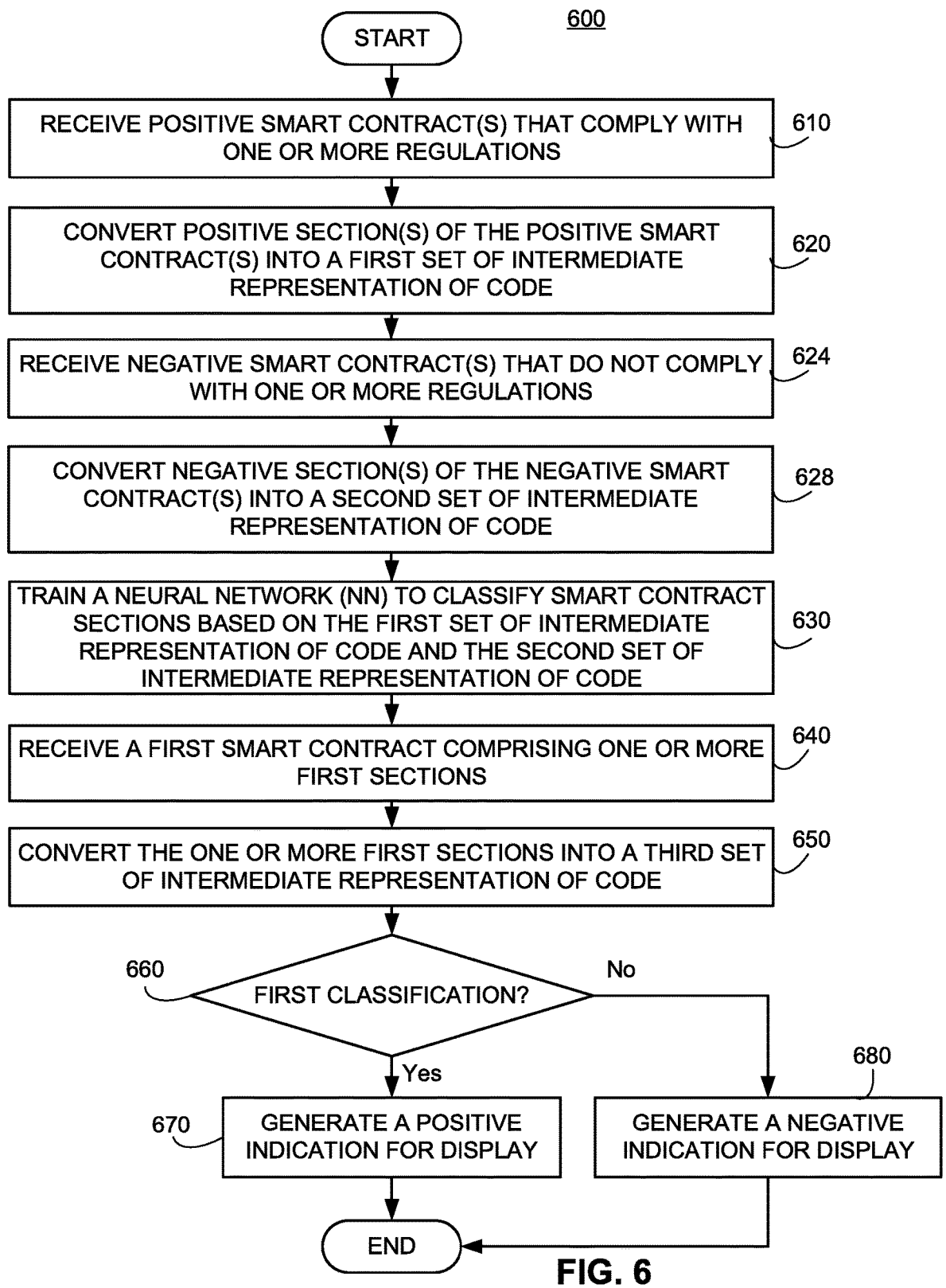
FIG. 6 is a flowchart of a method for training a neural network to determine compliance of a smart contract according to an example embodiment.

FIG. 6 shows a flowchart of a method 600 for training a neural network to determine whether a smart contract likely complies with regulations. Although method 400 may be performed by the service provider system 110, the computing device 120, or a combination thereof, the method is described as being performed by the service provider system 110 for ease of reference.

In block 610, the service provider system 110 may receive first training data including one or more positive smart contracts that comply with one or more regulations. Each of the one or more positive smart contracts may have one or more sections, but all of those sections must be positive sections. In some embodiments, the training data may be regulation and/or jurisdiction specific (e.g., Virginia-specific training data where a first smart contract is a positive smart contract based on one or more applicable regulations of Virginia, and Maryland-specific training data where the first smart contract is a negative smart contract based on one or more applicable regulations of Maryland).

In block 620, the service provider system 110 may convert the one or more positive sections of the one or more positive smart contracts into a first set of intermediate representation of code. In some embodiments, the service provider system 110 may convert the one or more positive sections of one or more positive jurisdiction specific (e.g., Virginia-based) smart contracts. In some embodiments, the service provider system 110 may use a complier to generate the first set of intermediate representation of code and the third set of intermediate representation of code.

In block 624, the service provider system 110 may receive second training data including one or more negative smart contracts that do not comply with the one or more regulations, each of the one or more negative smart contracts having one or more negative sections that do not comply with the one or more regulations. A user of computing device 120 may prepare existing smart contracts as first or second training data by comparing numerous smart contracts and categorizing each one as a positive smart contract or a negative smart contact based on whether the smart contract complies with regulations of a particular jurisdiction (e.g., state, country, or province). For example, a user may analyze a smart contract and the regulations of Virginia to determine whether a smart contract is unconscionable or whether the smart contract includes a material mistake that would render the smart contract unenforceable. In some embodiments, the training data may be regulation and/or jurisdiction specific (e.g., Virginia-specific training data where a first smart contract is a positive smart contract based on one or more applicable regulations of Virginia, and Maryland-specific training data where the first smart contract is a negative smart contract based on one or more applicable regulations of Maryland).

In block 628, the service provider system 110 may convert the one or more negative sections of the one or more negative smart contracts into a second set of intermediate representation of code. In some embodiments, the service provider system 110 may convert the one or more negative sections of one or more negative jurisdiction specific (e.g., Virginia-based) smart contracts. In some embodiments, the service provider system 110 may also convert one or more positive sections of the one or more negative jurisdiction specific (Virginia-based) smart contracts into the first set of intermediate representation of code. In some embodiments, the service provider system 110 may use a complier to generate the first set of intermediate representation of code and the third set of intermediate representation of code.

In block 630, the service provider system 110 may train a neural network (NN) to classify smart contract sections based on the first set of intermediate representation of code and the second set of intermediate representation of code.

In block 640, the service provider system 110 may receive a first smart contract including one or more first sections. For example, a user of computing device 120 may send, via the network 105 and to the service provider system 110, the first smart contact. The computer device 120 may email, upload via an online portal, or otherwise provide the first smart contract in any practical means to the service provider system 110.

In block 650, the service provider system 110 may convert the one or more first sections into a third set of intermediate representation of code. For example, the service provider system 110 may utilize a compiler to convert the one or more first sections into the second set of intermediate representation of code.

In block 660, the service provider system 110 may classify, by the NN, the third set of intermediate representation of code as a first classification corresponding to the first set of intermediate representation of code or as a second classification corresponding to the second set of intermediate representation of code.

In block 670, the service provider system 110 may, responsive to classifying the third set of intermediate representation of code as the first classification, generate for display a positive indication that the one or more first sections comply with the one or more regulations. For example, the positive indication may be a check mark (e.g., a green checkmark), or a green circle, located at the beginning of each of the one or more first sections. As another example, the positive indication may be the word "accepted" or "positive" in the one or more first sections. As another example, the positive indication may be a highlight of the one or more first sections that comply with the one or more regulations. As a further example, the positive indication would be a mark or indicator in the metadata of the one or more first sections of the smart contract.

In block 680, the service provider system 110 may, responsive to classifying the third set of intermediate representation of code as the second classification, generate for display a negative indication that that one or more first sections do not comply with the one or more regulations. For example, the negative indication may be an "X", a red circle, a red octagon, or any other indication located at the beginning of each of the one or more first sections. As another example, the negative indication may be the word "rejected" or "negative" in the one or more first sections. As another example, the positive indication may be a highlight of the one or more first sections that do not comply with the one or more regulations. As a further example, the positive indication would be a mark or indicator in the metadata of the one or more first sections of the smart contract. In some embodiments the service provider system 110 may transmit either the positive indication or the negative indication of the one or more first sections to a user device (e.g., computing device 120) for display.

Certain implementations provide the advantage of automatically determining whether a smart contract is likely in compliance with regulations.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Cases

The following example use case describes an example of a typical use of comparing two patent claims. It is intended solely for explanatory purposes and not in limitation. In one example, one or more users review many smart contracts to determine whether they comply with or do not comply with one or more regulations (e.g., whether a smart contract is unconscionable, whether the smart contract includes a material mistake that would render the smart contract unenforceable, or for example whether the smart contract is governed by Virginia law and includes a loan provision of more than 12% per year (which is not permitted by VA Code Ann. § 6.2-303 (2010))). The one or more users (e.g., lawyers and/or programmers) classify and label one or more sections of these smart contracts as in compliance or out of compliance. Using computer device 120, the user then transmits this training data (e.g., one or more smart contracts with one or more sections labeled in compliance and out of compliance) to the service provider system 110 via the network 105. The service provider system 110 then receives the training data, and converts one or more sections of the in compliance (e.g., positive) smart contracts into a first set of intermediate representation of code using a compiler. In some examples, using a compiler, the service provider system 110 may also convert one or more sections of the out of compliance (e.g., negative) smart contracts into a third set of intermediate representation of code. In some examples, the service provider system 110 may train a neural network (NN) (e.g., an RNN, a CNN, or a CRNN) to classify smart contract sections based on the first set of intermediated representation of code.

A user may want to know whether a particular smart contract complies with one or more regulations. Thus, the user submits a first smart contract to the service provider system 110 using a computing device 120 and network 105.

The service provider system 110 then receives the first smart contract from the computing device 120. In response, the service provider system 110 converts (e.g., using a compiler) the one or more first sections into a second set of intermediate representation of code. The service provider system 110 then classifies (e.g., using the NN) the second set of intermediate representation of code as a first classification corresponding to the first set of intermediate representation of code or as a second classification not corresponding to the first set of intermediate representation of code. The service provider system 110 generates for display a positive indication (e.g., a green circle, a check mark, stating "In Compliance," etc.) that the one or more first section comply with the one or more regulations in response to classifying the second set of intermediate representation of code as the first classification. The service provider system 110 generates for display a negative indication (e.g., a red circle, a red octagon, an "X," "Out of Compliance," etc.) that the one or more sections do not comply with one or more regulations in response to classifying the second set of intermediate representation of code as the second classification.

The service provider system 110 may then transmit the generated negative indication and/or the generated positive indication for the various sections of the first smart contract to the computing device 120 via the network 105. If the smart contract has negative indications associated with one or more sections, the user of the computing device 120 may revise the smart contract to bring it into compliance with one or more regulations. For example, the user may adjust the interested rate set for loans in the contact to 12% or less for a Virginia-based contract. The user may submit the revised smart contract to the service provider system 110 via the network 105 using computing device 120. The service providing system 110 then trains the NN (or a different NN) to suggest the change in the future to new smart contracts that have similar out of compliance or negative indications with a similar section of the smart contract.

What is claimed is:

1. A system, comprising:
   one or more processors; and
   a memory in communication with the one or more processors and storing instructions that, when executed by the one or more processors, are configured to cause the system to:
      receive training data comprising one or more positive smart contracts that comply with one or more regulations, each of the one or more positive smart contracts having one or more positive sections;
      convert, using one or more compilers, the one or more positive sections into a first set of intermediate representation of code;
      train a first neural network (NN) to classify smart contract sections based on the first set of intermediate representation of code;
      receive a first smart contract comprising one or more first sections;
      convert, using the one or more compilers, the one or more first sections into a second set of intermediate representation of code;
      classify, by the first NN, the second set of intermediate representation of code as a first classification corresponding to the first set of intermediate representation of code or as a second classification not corresponding to the first set of intermediate representation of code;
      responsive to classifying the second set of intermediate representation of code as the first classification, generate for display a positive indication that the one or more first sections comply with the one or more regulations; and
      responsive to classifying the second set of intermediate representation of code as the second classification, generate for display a negative indication that the one or more first sections do not comply with the one or more regulations.

2. The system of claim 1, wherein the training data further comprises one or more negative smart contracts that do not comply with the one or more regulations, each of the one or more negative smart contracts having one or more negative sections.

3. The system of claim 2, further comprising instructions that, when executed by the one or more processors, are configured to cause the system to:
   convert the one or more negative sections into a third set of intermediate representation of code; and
   train the first NN to classify smart contract sections based on the third set of intermediate representation of code; and
   wherein classifying the second set of intermediate representation of code by the first NN further comprises classifying, by the first NN, the second set of intermediate representation of code as the first classification, the second classification, or as a third classification corresponding to the third set of intermediate representation of code.

4. The system of claim 3, further comprising instructions that, when executed by the one or more processors, are configured to cause the system to:
   assign a first probability factor to the first classification; and
   generate a first probability factor indication for display based on the assigned first probability factor.

5. The system of claim 4, further comprising instructions that, when executed by the one or more processors, are configured to cause the system to:
   assign a second probability factor to the third classification; and
   generate a second probability factor indication for display based on the assigned second probability factor.

6. The system of claim 1, further comprising instructions that, when executed by the one or more processors, are configured to cause the system to:
   identify one or more first errors in the second set of intermediate representation of code.

7. The system of claim 6, further comprising instructions, that when executed by the one or more processors, are configured to cause the system to:
   generate, for display, an indication of the one or more first errors.

8. The system of claim 6, further comprising instructions that, when executed by the one or more processors, are configured to cause the system to:
   receive a revised first smart contract comprising one or more revised first sections that corresponds with and corrects the one or more first errors in the one or more first sections of the first smart contract;
   convert the one or more revised first sections into a fourth set of intermediate representation of code; and
   train a second NN based on the fourth set of intermediate representation of code to suggest a change to a second smart contract that would correct one or more second errors.

9. The system of claim 8, further comprising instructions that, when executed by the one or more processors, are configured to cause the system to:
  receive the second smart contract comprising the one or more second sections;
  convert the one or more second sections into a fifth set of intermediate representation of code;
  classify, by the first NN, the fifth set of intermediate representation of code as a third classification corresponding to the third representation of code;
  identify one or more second errors in the fifth set of intermediate representation of code; and
  generate a suggested change to the one or more second sections that would correct the one or more second errors.

10. The system of claim 1, further comprising instructions that, when executed by the one or more processors, are configured to cause the system to:
  transmit either the positive indication or the negative indication for each of the one or more first sections to a user device for display, wherein the first smart contract was received from the user device.

11. The system of claim 1, wherein the first NN is a convolutional neural network (CNN), a recurrent neural network (RNN), or a convolutional recurrent neural network (CRNN).

12. A system, comprising:
  one or more processors; and
  a memory in communication with the one or more processors and storing instructions that, when executed by the one or more processors, are configured to cause the system to:
    receive a smart contract comprising one or more sections;
    convert, using one or more compilers, the one or more sections into a first set of intermediate representation of code;
    classify, by a neural network (NN), the first set of intermediate representation of code as a first classification of being in a same category as a second set of intermediate representation of code associated with one or more positive smart contracts that comply with one or more regulations or as a second classification as not being in the same category as the second set of intermediate representation of code;
    responsive to classifying the first set of intermediate representation of code as the first classification, generate for display a positive indication that the one or more sections comply with the one or more regulations; and
    responsive to classifying the first set of intermediate representation of code as the second classification, generate for display a negative indication that the one or more sections do not comply with one or more regulations.

13. The system of claim 12, wherein classifying the first set of representation of code by the NN comprises classifying the first set of intermediate representation of code as the first classification, the second classification, or as a third classification as being in a same category as the third set of intermediate representation of code associated with one or more negative smart contracts that do not comply with the one or more regulations.

14. The system of claim 13, further comprising instructions that, when executed by the one or more processors, are configured to cause the system to:
  identify one or more first errors in the first set of intermediate representation of code, one or more second errors in the first set of intermediate representation of code, or a combination thereof; and
  responsive to identifying one or more first errors, generate for display an indication of the one or more first errors.

15. The system of claim 13, further comprising instructions that, when executed by the one or more processors, are configured to cause the system to:
  generate a first confidence score that the first classification is correct; and
  generate a first confidence score indication for display based on the generated first confidence score.

16. The system of claim 15, further comprising instructions that, when executed by the one or more processors, are configured to cause the system to:
  generate a second confidence score that the third classification is correct; and
  generate a second confidence score indication for display based on the generated second confidence score.

17. The system of claim 14, further comprising instructions that, when executed by the one or more processors, are configured to cause the system to, responsive to identifying one or more second errors, generate for display a suggested change to the one or more sections that would correct the one or more second errors.

18. The system of claim 12, wherein the NN is a convolutional neural network (CNN), a recurrent neural network (RNN), or a convolutional recurrent neural network (CRNN).

19. A system, comprising:
  one or more processors; and
  a memory in communication with the one or more processors and storing instructions that, when executed by the one or more processors, are configured to cause the system to:
    receive first training data comprising one or more positive smart contracts that comply with one or more regulations, each of the one or more positive smart contracts having one or more positive sections;
    convert, using one or more compilers, the one or more positive sections into a first set of intermediate representation of code;
    receive second training data comprising one or more negative smart contracts that do not comply with one or more regulations, each of the one or more negative smart contracts having one or more negative sections;
    convert, using the one or more compilers, the one or more negative sections into a second set of intermediate representation of code;
    train a first neural network (NN) to classify smart contract sections based on the first set of intermediate representation of code and the second set of intermediate representation of code;
    receive a first smart contract comprising one or more first sections;
    convert the one or more first sections into a third set of intermediate representation of code;
    classify, by the first NN, the third set of intermediate representation of code as a first classification corresponding to the first set of intermediate representation of code or as a second classification corresponding to the second set of intermediate representation of code;
    responsive to the third set of intermediate representation of code being classified as the first classification, generate for display a positive indication that the one or more first sections comply with the one or more regulations; and responsive to the third set of intermediate representation of code being classified as the second classification, generate for display a negative indication that the one or more first sections do not comply with the one or more regulations.

20. The system of claim 19, wherein:
the NN is a convolutional neural network (CNN), a recurrent neural network (RNN), or a convolutional recurrent neural network (CRNN).

* * * * *